(12) United States Patent
Roth

(10) Patent No.: US 10,746,324 B1
(45) Date of Patent: Aug. 18, 2020

(54) CABLE BRACE BRACKET, SYSTEM, AND METHOD OF CABLE BRACING

(71) Applicant: Steven Andrew Roth, Alamo, CA (US)

(72) Inventor: Steven Andrew Roth, Alamo, CA (US)

( * ) Notice: Subject to any disclaimer, the term of this patent is extended or adjusted under 35 U.S.C. 154(b) by 0 days.

(21) Appl. No.: 16/001,822

(22) Filed: Jun. 6, 2018

Related U.S. Application Data

(60) Provisional application No. 62/603,791, filed on Jun. 9, 2017.

(51) Int. Cl.
| | |
|---|---|
| *F16L 3/20* | (2006.01) |
| *H02G 3/30* | (2006.01) |
| *F16L 3/133* | (2006.01) |
| *F16L 3/14* | (2006.01) |
| *A44B 13/00* | (2006.01) |
| *E02D 27/34* | (2006.01) |
| *F16G 15/00* | (2006.01) |
| *F16B 45/00* | (2006.01) |
| *E04B 1/98* | (2006.01) |

(52) U.S. Cl.
CPC ............... *F16L 3/20* (2013.01); *F16L 3/133* (2013.01); *F16L 3/14* (2013.01); *H02G 3/30* (2013.01); *A44B 13/00* (2013.01); *A44B 13/0029* (2013.01); *E02D 27/34* (2013.01); *E04B 1/98* (2013.01); *F16B 45/00* (2013.01); *F16G 15/00* (2013.01)

(58) Field of Classification Search
CPC ..... F16L 3/20; F16L 3/133; F16L 3/14; E02D 27/34; E04B 1/98; H02G 3/30; F16B 45/00; F16G 15/00; A44B 13/00; A44B 13/0029

See application file for complete search history.

(56) References Cited

U.S. PATENT DOCUMENTS

| | | | | |
|---|---|---|---|---|
| 373,770 | A * | 11/1887 | Duncan | A22C 15/003 248/340 |
| D18,538 | S * | 8/1888 | Williamson | D8/370 |
| D24,287 | S * | 5/1895 | Snedden | D8/370 |
| D31,995 | S * | 12/1899 | Alker | D8/370 |
| 668,409 | A * | 2/1901 | Keller | A44B 13/0011 24/695 |
| 1,057,067 | A * | 3/1913 | Leib | A44B 13/0011 24/695 |
| 1,535,279 | A * | 4/1925 | Yoder | F16B 45/00 59/85 |
| D99,881 | S * | 6/1936 | Miller | D8/499 |
| 2,842,822 | A * | 7/1958 | Bennett | F16B 45/06 24/370 |
| 2,909,386 | A * | 10/1959 | Ramey | B66C 1/00 294/82.1 |
| D207,933 | S * | 6/1967 | Brown | D8/373 |

(Continued)

OTHER PUBLICATIONS

International Seismic Application Technology, Style 11S250R11 Rod Capture Light Duty Bracket, Nov. 1, 2006.

*Primary Examiner* — Eret C McNichols
(74) *Attorney, Agent, or Firm* — Steven R. Vosen

(57) ABSTRACT

Cable brace brackets and a system for bracing are provided. The cable brace bracket includes two hooks of different sizes and having a bracket angle between them that is less than 90°. The system using to cable brace brackets connected with a cable. One hook of each bracket is held against a surface using a threaded rod through the surface, and the other hook is interlocked with loops at the end of the cable.

15 Claims, 4 Drawing Sheets

(56) References Cited

U.S. PATENT DOCUMENTS

| | | | | |
|---|---|---|---|---|
| 4,646,396 | A * | 3/1987 | Geese | F16B 45/02 223/88 |
| 4,957,259 | A * | 9/1990 | Wolf, Jr. | A47F 5/0006 211/119 |
| 5,188,317 | A * | 2/1993 | Roth | H02G 3/26 248/59 |
| D398,836 | S * | 9/1998 | Kalat | D8/370 |
| 6,270,048 | B1 * | 8/2001 | Carlson | B60P 1/00 224/560 |
| 6,837,009 | B1 * | 1/2005 | Roth | E04H 9/02 24/563 |
| 6,971,623 | B2 * | 12/2005 | Allmon | E04H 9/02 248/316.5 |
| 7,654,043 | B2 * | 2/2010 | Heath | F16L 3/133 248/317 |
| 7,739,775 | B2 * | 6/2010 | Shimanski | B60P 7/0807 24/265 H |
| 8,096,517 | B1 * | 1/2012 | Hamilton | B60R 11/0252 248/308 |
| 8,905,448 | B2 * | 12/2014 | Vaz Coelho | B66C 1/66 294/82.11 |
| 9,004,424 | B2 * | 4/2015 | Feddes | F16M 11/041 248/224.51 |
| 9,249,825 | B1 * | 2/2016 | Cornay | F16B 45/00 |
| 9,366,362 | B2 * | 6/2016 | Maki | B60T 17/046 |
| 9,694,877 | B2 * | 7/2017 | Miles | A44B 13/0029 |
| D802,399 | S * | 11/2017 | Ward | D8/367 |
| 10,036,487 | B2 * | 7/2018 | Duggan | E04B 1/98 |
| 2004/0031887 | A1 * | 2/2004 | Heath | F16L 3/133 248/62 |
| 2005/0087662 | A1 * | 4/2005 | Jacobs | F16L 3/14 248/339 |
| 2006/0237609 | A1 * | 10/2006 | Spencer | F16B 45/00 248/304 |
| 2011/0186702 | A1 * | 8/2011 | Broadley | F16M 13/02 248/220.21 |
| 2016/0289957 | A1 | 10/2016 | Roth | |
| 2018/0117374 | A1 * | 5/2018 | Pascoe | A62B 35/0068 |
| 2019/0101152 | A1 * | 4/2019 | Turbenson | F16B 2/245 |
| 2019/0211867 | A1 * | 7/2019 | Hohn | F16B 2/248 |
| 2019/0257351 | A1 * | 8/2019 | Johnson | A47G 33/10 |

* cited by examiner

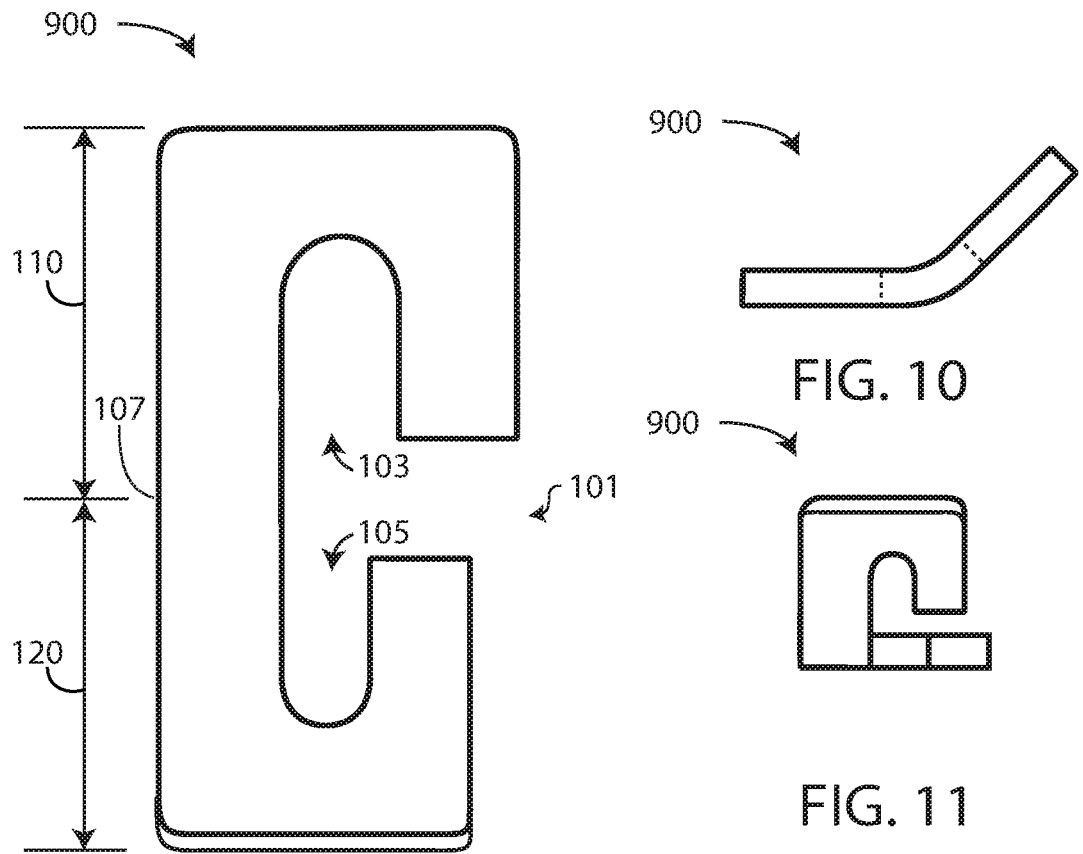
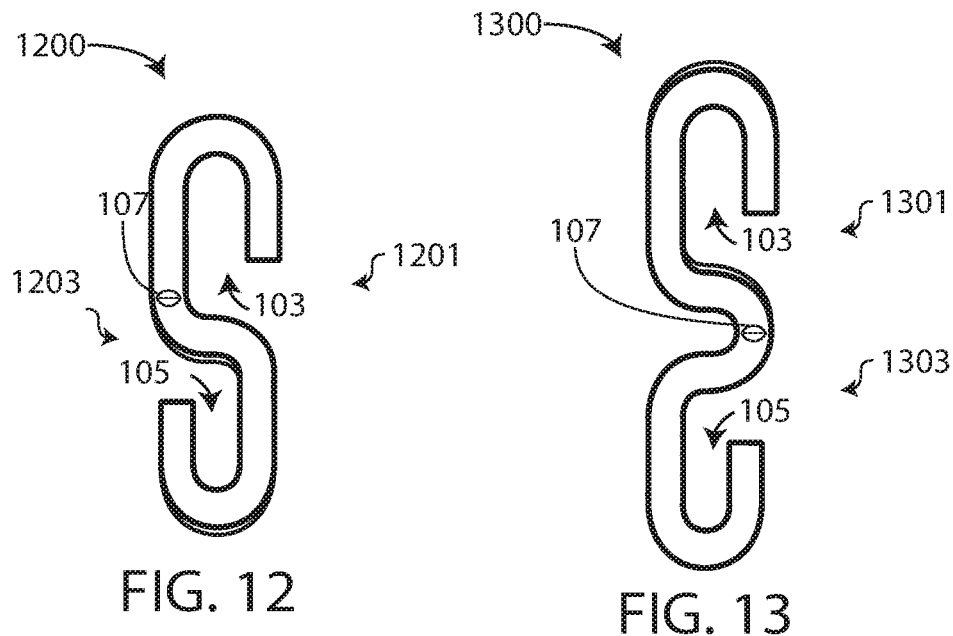

CABLE BRACE BRACKET, SYSTEM, AND METHOD OF CABLE BRACING

CROSS-REFERENCE TO RELATED APPLICATIONS

This application claims the benefit of U.S. Provisional Application No. 62/603,791, filed on Jun. 9, 2017, the contents of which are hereby incorporated by reference in its entirety.

BACKGROUND OF THE INVENTION

Field of the Invention

The present invention generally relates to an apparatus and method employed in the building construction industry, and more particularly to an apparatus and method to stabilize loads due to movement from seismic events.

Discussion of the Background

The interior of commercial buildings may include numerous service elements, including conduits, pipes, ducting, systems and the like, referred to herein without limitation as "conduits." Typically, conduits are suspended from an overhead structure using a plurality of tension assemblies that are spaced along the length of the conduit, where the tension assemblies include a hanger, clamp or trapeze, referred to herein without limitation as a "hanger," to cradle or support the conduit.

While the use conventional hangers is sufficient to support conduits under normal, static loading conditions, a "seismic event," which may be, for example, an earthquake, explosion, collision or like event, moves the conduit relative to the building and result in lateral and/or axial movement of the conduit relative to the building. This movement may, in turn, dramatically increase the load on the hanger and/or on the overhead structure to which the hangers are attached. Seismic events of sufficient intensity may damage the hanger, conduit and/or the overhead structure supporting the hanger.

Thus there is a need in the art for a bracket, and method of bracing conduits suspended from overhead structures. The bracket should inhibit or prevent motion of the conduit and/or hanger relative to the overhead structure supporting the hanger. The bracket should also be compatible for use with prior art hangers, be easier to install and be lighter, smaller, and less expensive than prior art brackets, and should be easy to manufacture. The method should be capable of retrofitting a hanger without removing a previously installed the hanger or conduit.

BRIEF SUMMARY OF THE INVENTION

The present invention provides a cable brace bracket and system that is attachable to a hanger and/or a building surface, preferably the overhead structure that supports the hanger and can be used to brace a load to the building structure.

The present invention also provides method for stabilizing a hanger and conduit with removing previously installed hangers or conduits.

The use of inventive cable brace bracket, system, and method for bracing a load may prevent damage to buildings caused by movement of conduits which are suspended from the building. In certain embodiments, the brackets may be used to provide stability to conduit hanger assemblies by reducing lateral and/or axial movement during a seismic event.

One embodiment provides a cable brace bracket including a first hook in a first plane, where the first hook has a throat with parallel sides and a first gap and a second hook in a second plane having a normal line, where the second hook has a throat with parallel sides. The width of the first gap is different than the width of the second gap, and an angle between the first plane and the line normal, $\beta$, is less than 90°. In various embodiments, the width of the first gap is ½ inch, the width of the second gap is ⅜ inch, and the width of the second gap is ⅝ inch. In various other embodiments, $\beta$ is between 15° and 75° or between 30° and 60°, In other embodiments, $\beta$ is between 30° and 45° or between 45° and 60°.

In certain embodiments, a bracket may be provided with nominal angle, $\gamma$, which corresponds to an actual angle $\beta$ plus or minus some small value $\Delta$, such as $\Delta=7.5°$. Thus, for example, for a nominal angle, $\gamma$, the angle $\beta$ is within the range of $\gamma-\Delta \leq \beta \leq \gamma+\Delta$. In various embodiments, the nominal angle, $\gamma$, is 15°, is 30°, is 45°, is 60°, or is 75°.

Another embodiment provides a system for attaching the end a cable to a threaded rod protruding from a surface. The system includes a cable brace bracket including a first hook in a first plane, where the first hook has a throat with parallel sides and a first gap, and a second hook in a second plane having a normal line, where the second hook has a throat with parallel sides, where the width of the first gap is different than the width of the second gap, and where an angle between the first plane and the line normal, $\beta$, is less than 90°. The threaded rod passes through the first hook and where the cable brace bracket is secured to the surface using a nut on the threaded rod, and the end of the cable includes a loop that passes through the second hook.

Yet another embodiment provides a system for connecting a first threaded rod protruding from a first surface and a second threaded rod protruding from a second surface. The system includes a first cable brace bracket, a second cable brace bracket and a cable brace. The first cable brace bracket includes a first hook in a first plane, where the first hook has a throat with parallel sides and a first gap, and a second hook in a second plane having a normal line, where the second hook has a throat with parallel sides, where the width of the first gap is different than the width of the second gap, and where an angle between the first plane and the line normal, $\beta 1$, is less than 90°. The second cable brace bracket includes a first hook in a first plane, where the first hook has a throat with parallel sides and a first gap, and a second hook in a second plane having a normal line, where the second hook has a throat with parallel sides, where the width of the first gap is different than the width of the second gap, and where an angle between the first plane and the line normal, $\beta 2$, is less than 90°. The cable brace includes a cable having a first loop at one end of the cable and a second loop at the second end of the cable. The first threaded rod passes through the first hook of the first cable brace and is secured to the first surface using a first nut on the first threaded rod, the second threaded rod passes through the first hook of the second cable brace bracket and is secured to the second surface using a second nut on the second threaded rod, where the first loop is interlocked with with the second hook of the first cable brace bracket, and the second loop is interlocked with the second hook of the second cable brace bracket.

Another embodiment provides a method for stabilizing a hanger supported from an overhead structure by a threaded rod utilizing a cable brace bracket including a first hook in a first plane, where the first hook has a throat with parallel sides and a first gap, and a second hook in a second plane having a normal line, where the second hook has a throat with parallel sides, where the width of the first gap is different than the width of the second gap, and where an angle between the first plane and the line normal, β, is less than 90°. The method includes placing the first hook around the threaded rod without removing the hanger from the threaded rod, placing a loop at the end of a cable in the second hook, and adjusting the loop to increase the tension in the cable.

These features together with the various ancillary provisions and features which will become apparent to those skilled in the art from the following detailed description, are attained by the cable brace bracket, system, and method of the present invention, preferred embodiments thereof being shown with reference to the accompanying drawings, by way of example only, wherein:

BRIEF DESCRIPTION OF THE SEVERAL VIEWS OF THE DRAWING

FIG. 9 is a top view of a second embodiment cable brace bracket;

FIG. 10 is side view 10-10 of FIG. 9;

FIG. 11 is an end view 11-11 of FIG. 9;

FIG. 12 is a top view of a third embodiment cable brace bracket; and

FIG. 13 is a top view of a fourth embodiment cable brace bracket.

Reference symbols are used in the Figures to indicate certain components, aspects or features shown therein, with reference symbols common to more than one Figure indicating like components, aspects or features shown therein.

DETAILED DESCRIPTION OF THE INVENTION

Figure 1:
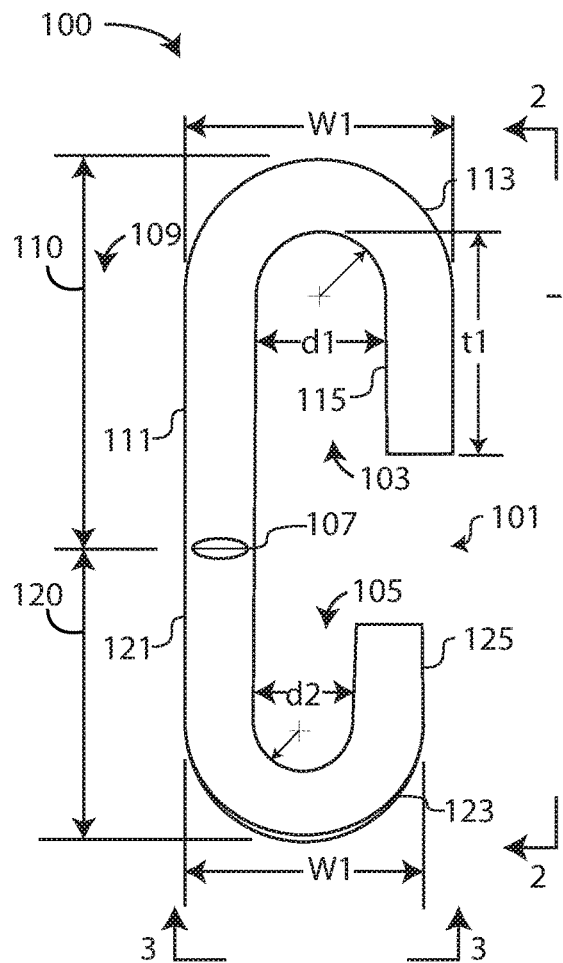
FIG. 1 is a top view of a first embodiment cable brace bracket.
Figure 2:
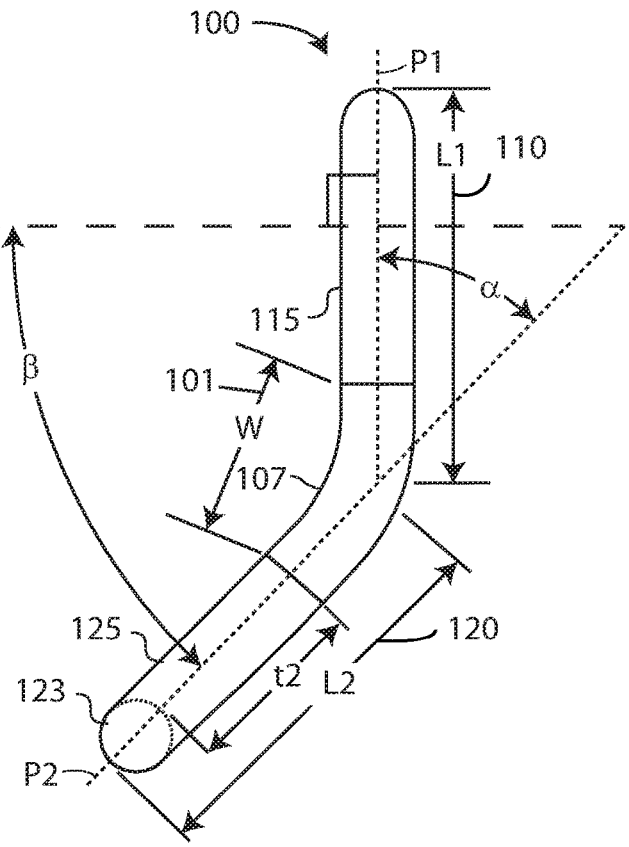
FIG. 2 is side view 2-2 of FIG. 1.
Figure 3:
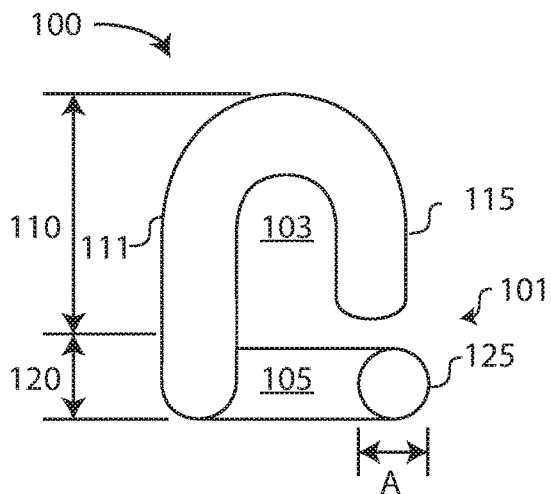
FIG. 3 is an end view 3-3 of FIG. 1.

FIGS. 1, 2, and 3 are a top view, side view, and end view, respectfully, of a first embodiment cable brace bracket 100. Bracket 100 has an opening 101 of size W that provides access to a first hook 103, which is part of a first bracket portion 110 and to a second hook 105, which is part of a second bracket portion 120. Bracket 100 is formed from a length of metal rod having a circular cross-section of diameter A, which is the depth of the bracket, as shown in FIG. 3. In one embodiment, A is ¼ inch. In alternative embodiments, A may be larger or smaller, such as A=⅜ inch or A=⅛ inch steel rod.

As illustrated in FIGS. 1 and 2, first bracket portion 110 has a length L1 and width W1 and includes first shank potion 111, a first bend 113, and a first front 115. First shank potion 111 and first front 115 are generally parallel and separated by a distance d1, and first bend 113 also has a diameter of d1.

First hook 103 thus has a gap with dimension d1 and a throat having dimension t1. Second bracket portion 120 has a length L2 and a width W2 and includes a second shank portion 121, a second bend 123, and a second front 125. Second shank potion 121 and second front 125 are generally parallel and separated by a distance d2, and second bend 123 also has a diameter of d2. Second hook 105 thus has a gap with dimension d2 and a throat having dimension t2.

Shank 109 is bent along a bend line 107 such that first bracket portion 110 (and thus first hook 103) and second bracket portion 120 (and thus second hook 105) lie in different planes, indicated as plane P1 for the first bracket portion and plane P2 for the second bracket portion. FIG. 2 illustrates two measures of the angle between planes P1 and P2. The first is angle α, which is the included angle between the two planes. The second angle is the angle β, which is the angle between plane P2 and a line perpendicular to plane P1. The angle angle β is referred to herein without limitation as the "bracket angle." The relationship between the angles is given by: β+α=90°.

In certain embodiment, the bracket angle β the two planes intersect at an angle that is less than 180°. In various embodiments, β is between 30° and 60°, is between 30° and 45°, or is between 45° and 60°. In other embodiments, β is 30°, is 45°, or is 60°.

In certain embodiments, gaps d1 and d2 have different sizes, with gap d1 greater than gap d2. Thus, for for example and without limitation, d1=½ inch and d2=⅜ inch. In another embodiment, d1=½ inch and d2=⅝ inch. In certain other embodiments, gap d1 is less than gap d2.

In certain embodiments, W is equal to or greater than the smallest of d1 or d2, and in other embodiments, W is equal to or greater than either one of d1 or d2. In certain embodiments, the length L1 is 1½ inches and the length L2 is 1 inch. While these examples have d1 greater then d2, there is, in general, there is no requirement that d1 is greater than d2.

Figure 4:
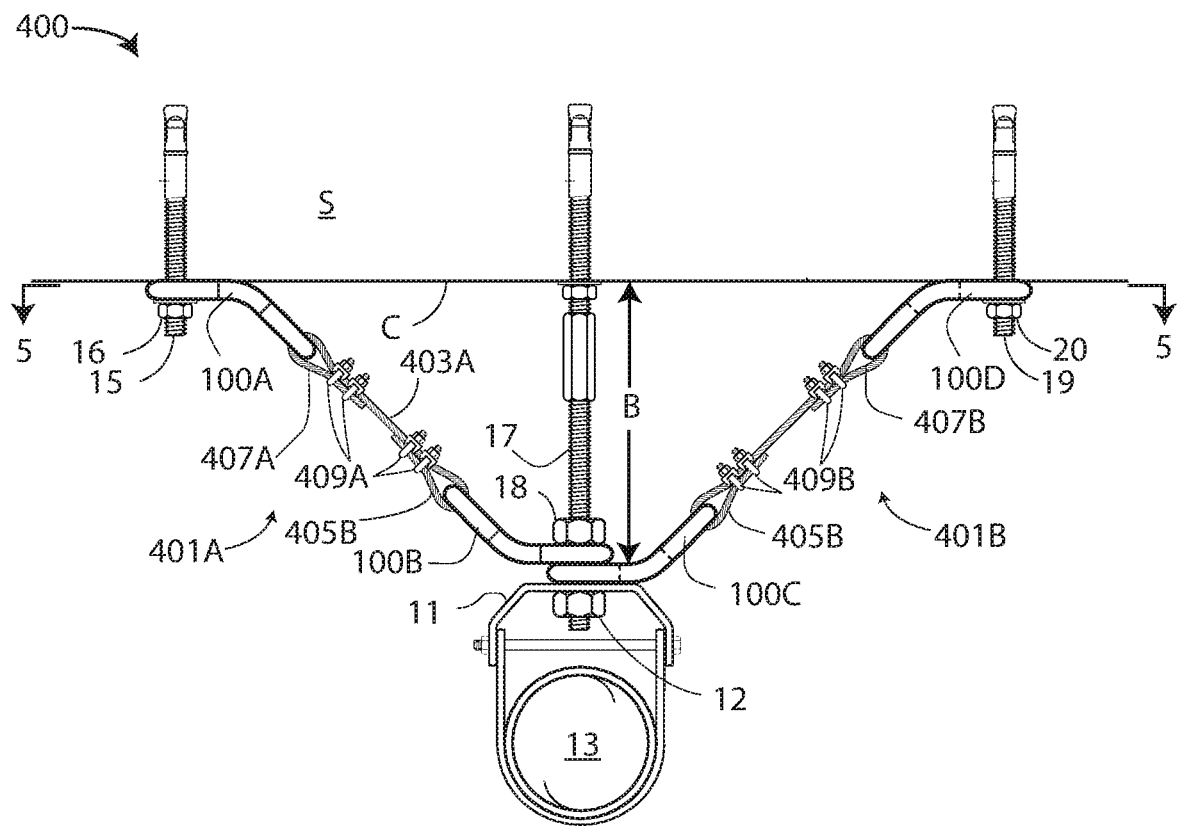
FIG. 4 is an elevational view illustrating the use of several cable brace brackets of FIG. 1.
Figure 5:
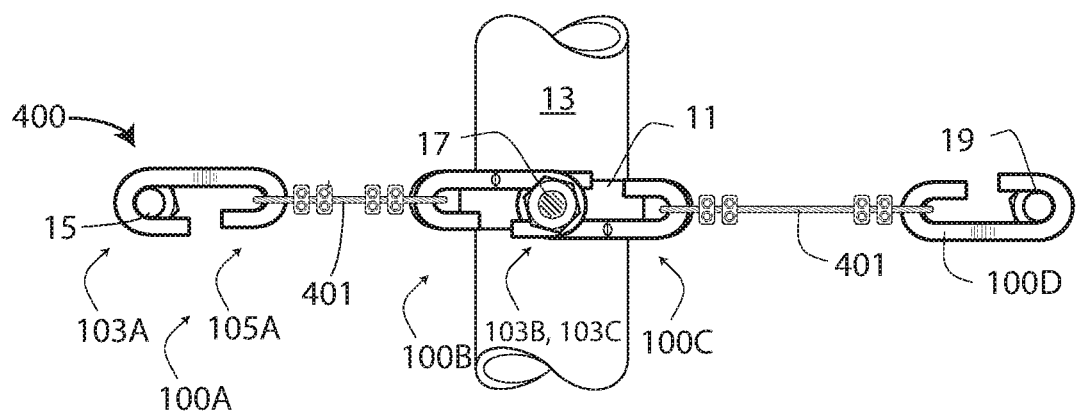
FIG. 5 is a top view 5-5 of FIG. 4.

FIG. 4 is an elevational view of a double lateral cable brace assembly 400 that uses several cable brace brackets 100, indicated as brackets 100A, 100B, 100C, and 100D, and FIG. 5 is a top view 5-5 of FIG. 4.

As shown in FIG. 4, double lateral cable brace assembly 400 stabilizes a hanger 11 supporting conduit 13 that is attached below a ceiling C of an overhead structure S using bolt, anchor, or threaded rod 17 using cables that connect the threaded rod near the hanger to bolts, anchors, or threaded rods 15 and 19, which are each anchored into the overhead structure.

Conduit 13 is held within hanger 11, which is supported a distance B below ceiling by a nut 12 at the end of threaded rod 17.

Brackets 100A, 100B, 100C, and 100D are each generally similar to cable brace bracket 100 and include elements from FIGS. 1-3, where the suffix A, B, C, or D is used to denote the parts on brackets 100A, 100B, 100C, and 100D.

First hook 103A of cable brace bracket 100A is secured to a ceiling C of overhead structure S using a nut 16 on threaded rod 15, first hook 103D of cable brace bracket 100D is secured to the ceiling using a nut 20 on threaded rod 19, and first hooks 103B and 103C of cable brace brackets 100B and 100C, respectively, are stacked on top of one another and are secured to hanger 11 using a nut 18 on threaded rod 17. Importantly, the length of throats t1 and/or t2 is sufficiently long to allow the brackets to be stacked on one another and remain parallel to the surface to which they are attached.

It is preferred, though not required, that gap d1 of first hook 103A is slightly larger than the diameter of threaded rod 15, the gap d1 of first hook 103B and of first hook 103C is slightly larger than the diameter of threaded rod 17, and the gap d1 of first hook 103D is slightly larger than the diameter of threaded rod 19. As discussed above, d1 is, for example, ½ inch and d2 may be, for example, ⅜ inch or ⅝ inch. Preferable the sides of d1 and d2 are the nominal size of threaded rod. Thus, for example, an ATSM ½ diameter threaded rod has an actual diameter of from 0.4822 to 0.4985, and would this fit within a gap d1 of ½ inch.

The dimensions of d1 d2, L1, L2, W, A, and and the material of each of brackets 100A, 100B, 100C, and 100D may be the same, or they may be different as needed according to the geometry of the parts to which they are attached. In assembly 400, hanger 11 and ceiling C are not in coplanar, and the angles β are selected according to the spacing of threaded rods 15, 17, and 19 and the distance B.

Specifically, in certain embodiments, each cable brace bracket 100 may have a different angle β, gaps d1 and d2, and the length of cables 403A and 403B may be different as required by the spacing and length of rods 15, 17, and 19, to property secure conduit 13, as would be obvious to one skilled in the art. In the embodiment of FIGS. 4 and 5, brackets 100A, 100B, 100C, and 100D each have brace angle β=45°, and gaps d1=½ inches and d2=⅜ inches.

Double lateral cable brace assembly 400 also includes cable braces 401A and 401B that each includes a length of cable 403A/403B between a first loop 405A/405B and a second loop 407A/407B. In the embodiment of FIGS. 4 and 5, the loop is formed using clamps 409A/409B at one or both ends of the cable, allowing a user to adjust the length and/or tension in the cable by pulling of a free end of the cable and tightening the clamp at the desired length and/or tension in the cable brace. In alternative embodiments, one of loops 405A, 405B, 407A, and 407B is pre-formed in the cable brace, and/or other devices are used to adjust the length of the cable between the loops. The diameters of cable 403A and 403B may be the same or may be different, and may be, for example and without limitation, between ⅙ inch and ¼ inch.

Specifically, cable brace 401A has loop 407A is interlocked with and supported by second hook 105A and loop 405B is interlocked with and supported by second hook 105B. Cable brace 401B is used to connect cable brace bracket 100C and 100D, with loop 407B supported by second hook 105D and loop 405B supported by second hook 105C. With cable brace brackets 401A and 401B attached to brackets 100A, 100B, 100C, and 100D shown in FIGS. 4 and 5 conduit 13 is stabilized against swaying side-to-side. In one embodiment, cable braces 401A and 401B each have one loop, such as loop 407A and 407B formed at one end, and the second loop, such as loop 405A and 405B are formed by adjusting the length of the cable, as described above.

In one embodiment, assembly 400 is assembled according to the following steps
1) Threaded rod 17 is provided first with nut 16, then with hanger 11, and then with nut 12.
2) Nut 18 is loosened, making room for stacked brackets 100B and 110C between the nut and hanger 11.
3) Bracket 100A is secured onto ceiling C by placing the hook of the bracket most closely matching the diameter of threaded rod 15 about the threaded rod and loosely tightening using nut 16 against the bracket to allow the bracket to rotate about the threaded rod.
4) Bracket 100D is secured onto ceiling C by placing the hook of the bracket most closely matching the diameter of threaded rod 19 about the threaded rod and loosely tightening using nut 20 against the bracket to allow the bracket to rotate about the threaded rod.
5) The hooks of brackets 100B and 100C most closely matching the diameter of threaded rod 17 are placed about the threaded rod, one on top of the other, and nut 18 is loosely tightened to allow brackets 100B and 100C to rotate about the threaded rod.
6) Loop 407A of cable brace 401A is placed over the free hook of bracket 100A and loop 405A is placed over the free hook of bracket 100B, and the tension in the cable brace is adjusted by pulling on the free end of the cable, permitting brackets 100A and 100B to align with the cable brace.
7) Loop 407B of cable brace 401B is placed over the free hook of bracket 100D and loop 405B is placed over the free hook of bracket 100C, and the tension in the cable brace is adjusted by pulling on the free end of the cable, permitting brackets 100C and 100D to align with the cable brace.
8) Nuts 15, 18, and 19 are tightened,
9) The tension in cable braces 401A and 401B is adjusted by pulling on the free ends of the cables and tightening clamps 409A and 409B.

Since steps 2) through 7) can be performed on a preexisting threaded rod 17/hanger 11 assembly (that is where step 1) has been previously performed) without removing the hanger from the threaded rod, or by removing conduit 13 from the hanger, the inventive brackets 100 are thus seen to be useful in performing a retrofit stabilization of a preexisting hanger.

Having a cable brace bracket with two different size hooks, where one hook is attached to a structure using a threaded rod and where the other hook supports a cable, utilizes complementary strengths of the two hooks. Thus, the strength of the connection of a hook supported by bolting it to a surface by a threaded rod passing there through, as is the case with brace 100A in FIG. 4, depends on the diameter of the threaded rod. A hook with a larger gap and corresponding threaded rod diameter can support a larger load that a hook with a smaller gap and corresponding smaller threaded rod diameter. The strength of the connection of a cable pulling on a hook also depends on the hook diameter, with a hook with a smaller gap being able to support a higher load than a hook with a larger gap.

Thus, a cable brace bracket with a threaded rod in the bigger hook and the cable on the smaller hook will be able to support a larger load than a cable brace bracket with a threaded rod in the smaller hook and the cable on the larger hook. Further, it is noted that using the hook with the smaller gap provides a stronger connection than if both hooks had the same gap dimension.

The inventive cable brace brackets may be used to stabilize both sides of a suspended load, as shown in FIGS. 4 and 5, may be used to stabilize one side of a suspended load, or may be combined with other cable brace brackets to stabilize more than one suspended load.

Figures 6, 7:
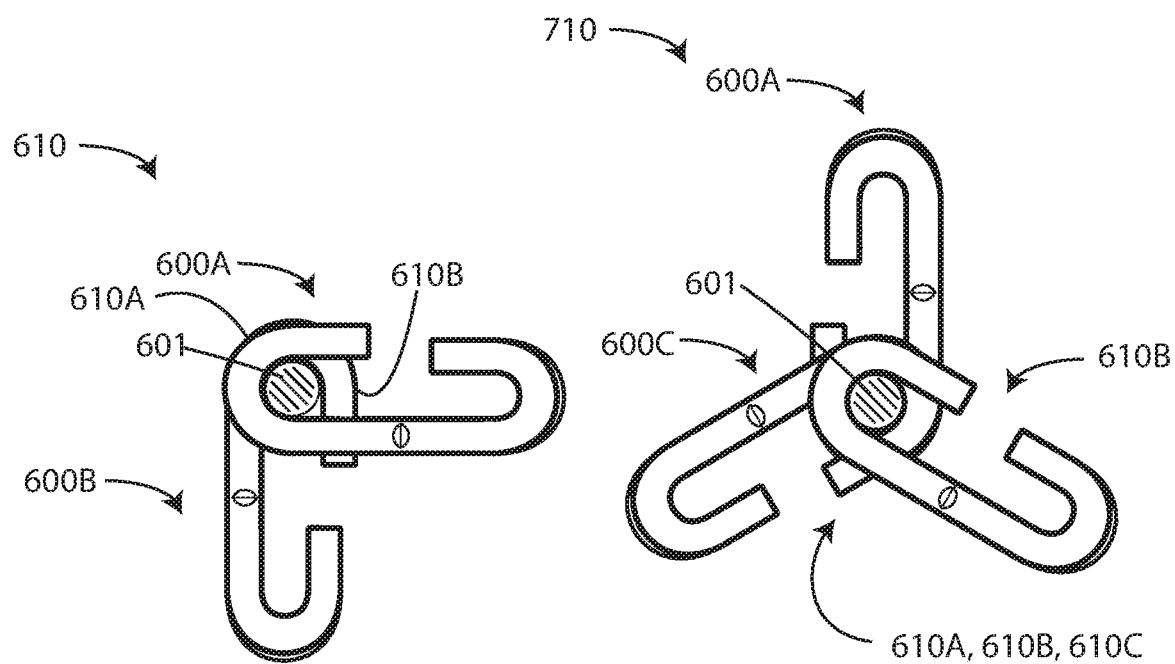
FIG. 6 is a top view of a one embodiment of two cable brace brackets bolted to a surface.
FIG. 7 is a top view of one embodiments of three cable brace brackets bolted to a surface.
Figure 8:
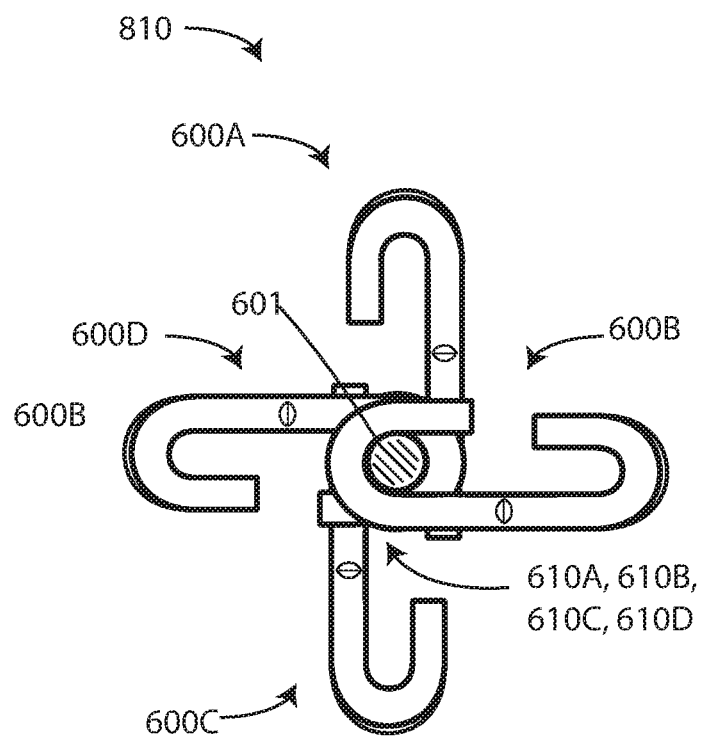
FIG. 8 is a top view of one embodiment of four cable brace brackets bolted to a surface.

FIGS. 6-8 are top views which illustrate examples of how two or more cable brace brackets can be stacked on the the same threaded rod 601. Brackets 600A, 600B, 600C, and 600D are each similar to bracket 100, and may have different gaps d1 and brace angle β.

FIG. 6 is a configuration 610, in which the angle between cable brace brackets 600A and 600B is 90°. FIG. 7 is a configuration 710, in which the angle between any two of cable brace brackets 600A, 600B, and 600C is 120°. FIG. 8 is a configuration 810, in which the angle between any two of brace brackets 600A, 600B, 600C, and 600D is 90°. In addition, the brace angles β for each cable brace bracket in each of FIGS. 6-8 may be the same, may be different, and may be in configurations 610, 710, and 810 may be opposite directions—that is, toward or away from the supporting surface. It is thus seen that cable brace brackets 100 or 600 may be used to stabilize a number of structures in a large number of configurations.

FIGS. 9-13 are alternative embodiments of cable brace bracket 100, each of which has the same general dimensions and materials as cable brace bracket 100 and includes two hooks in different planes, as discussed above. These cable brace brackets may be used in place of cable brace bracket 100 or in combinations with other cable brace bracket embodiments, except as explicitly stated.

FIGS. 9, 10, and 11 are a top view, side view, and end view, respectfully, of a second embodiment cable brace bracket 900 which is formed from a flat metal plate. The plate may have a thickness, for example and without limitation, of between ⅛" and ⅜".

FIG. 12 is a top view of a third embodiment cable brace bracket 1200, which is "S" shaped. Cable brace bracket 1200 has a first opening 1201 to provide access to first hook 103 and a second opening 1203 to provide access to second hook 105. First opening 1201 and second opening 1203 are on opposite sides of cable brace bracket 1200.

FIG. 13 is a top view of a fourth embodiment cable brace bracket 1300, which has a first opening 1301 to provide access to first hook 103 and a second opening 1303 to provide access to second hook 105. First opening 1301 and second opening 1303 are on the same side of cable brace bracket 1300.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

I claim:

1. A system for connecting a first threaded rod protruding from a first surface and a second threaded rod protruding from a second surface, the system comprising:
a first cable brace bracket including a first hook in a first plane, where the first hook has a throat with parallel sides and a first gap, and a second hook in a second plane having a normal line, where the second hook has a throat with parallel sides and a second gap, where the width of the first gap is different than the width of the second gap, and where an angle between the first plane and the normal line, $\beta 1$, is less than 90°;
a second cable brace bracket including a first hook in a first plane, where the first hook has a throat with parallel sides and a first gap, and a second hook in a second plane having a normal line, where the second hook has a throat with parallel sides, where the width of the first gap is different than the width of the second gap, and where an angle between the first plane and the normal line, $\beta 2$, is less than 90°; and
a cable brace including a cable having a first loop at one end of the cable and a second loop at the second end of the cable,
where the first threaded rod passes through the first hook of the first cable brace and is secured to the first surface using a first nut on the first threaded rod,
where the second threaded rod passes through the first hook of the second cable brace bracket and is secured to the second surface using a second nut on the second threaded rod,
where the first loop is interlocked with the second hook of the first cable brace bracket; and
where the second loop is interlocked with the second hook of the second cable brace bracket.

2. The system of claim 1, where the first gap of the first hook or the second hook has a width of ½ inch.

3. The system of claim 1, where the second gap of the first hook or the second hook has a width of ⅜ inch.

4. The system of claim 1, where the second gap of the first hook or the second hook has a width of ⅝ inch.

5. The system of claim 1, where $\beta 1$ or $\beta 2$ is between 30°±7.5° and 60°±7.5°.

6. The system of claim 1, where $|\beta 1 - \beta 2| \leq 7.5°$.

7. The system of claim 1, where $|\beta 1 - \beta 2| > 7.5°$.

8. A method for stabilizing a hanger supported from an overhead structure by a threaded rod utilizing a cable brace bracket including a first hook in a first plane, where the first hook has a throat with parallel sides and a first gap, and a second hook in a second plane having a normal line, where the second hook has a throat with parallel sides and a second gap, where the width of the first gap is different than the width of the second gap, and where an angle between the first plane and the normal line, $\beta$, is less than 90°, the method comprising:
placing the first hook around the threaded rod without removing the hanger from the threaded rod;
placing a loop at the end of a cable in the second hook; and
adjusting the loop to increase the tension in the cable.

9. The method of claim 8, where the cable brace bracket is a first cable brace bracket, where $\beta = \beta 1$, where the method utilizes a second cable brace bracket including a first hook in a first plane, where the first hook has a throat with parallel sides and a first gap, and a second hook in a second plane having a normal line, where the second hook has a throat with parallel sides and a second gap, where the width of the first gap is different than the width of the second gap, and where an angle between the first plane and the normal line, $\beta 2$, is less than 90°, the method further comprising:
placing the first hook of the second cable brace bracket around the threaded rod without removing the hanger from the threaded rod;
placing a second loop at the end of a second cable in the second hook of the second cable brace bracket; and
adjusting the second loop to increase the tension in the second cable.

10. The method of claim 9, where the first gap of the first hook or the second hook has a width of ½ inch.

11. The method of claim 9, where the second gap of the first hook or the second hook has a width of ⅜ inch.

12. The method of claim 9, where the second gap of the first hook or the second hook has a width of ⅝ inch.

13. The method of claim 9, where $\beta 1$ or $\beta 2$ is between $30°\pm7.5°$ and $60°\pm7.5°$.

14. The method of claim 9, where $|\beta 1 - \beta 2| \leq 7.5°$.

15. The method of claim 9, where $|\beta 1 - \beta 2| > 7.5°$.

* * * * *